(12) United States Patent
Kim et al.

(10) Patent No.: US 7,620,366 B2
(45) Date of Patent: Nov. 17, 2009

(54) PREFIX DELEGATION SYSTEM AND METHOD OF AD-HOC NETWORK

(75) Inventors: Jae-hoon Kim, Seoul (KR); Kyung-lim Kang, Suwon-si (KR); Young-gon Choi, Suwon-si (KR); Yong-sung Roh, Icheon-si (KR); Jung-ho Kim, Suwon-si (KR); Shubhranshu Singh, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 421 days.

(21) Appl. No.: 11/181,795

(22) Filed: Jul. 15, 2005

(65) Prior Publication Data

US 2006/0013193 A1    Jan. 19, 2006

(30) Foreign Application Priority Data

Jul. 15, 2004    (KR)    ........... 10-2004-0055134

(51) Int. Cl.
*H04J 3/24* (2006.01)
(52) U.S. Cl. ............................ 455/41.2; 370/349
(58) Field of Classification Search ........... None
See application file for complete search history.

(56) References Cited

U.S. PATENT DOCUMENTS

2002/0131386 A1* 9/2002 Gwon ............... 370/338
2002/0133607 A1* 9/2002 Nikander ............ 709/229
2003/0026230 A1* 2/2003 Ibanez et al. ........ 370/338
2004/0203787 A1* 10/2004 Naghian ............. 455/437

FOREIGN PATENT DOCUMENTS

| JP | 10-190717 | 7/1998 |
| JP | 2002-033764 | 1/2002 |
| JP | 2004-048503 | 2/2004 |
| JP | 2004-080217 | 3/2004 |

OTHER PUBLICATIONS

Wakikawa, R. et al., *Global connectivity for IPv6 Mobile Ad Hoc Networks*, Internet Draft, <draft-wakikawa-manet-globalv6-03.txt>, Oct. 23, 2003.

* cited by examiner

*Primary Examiner*—Nick Corsaro
*Assistant Examiner*—Joel Ajayi
(74) *Attorney, Agent, or Firm*—Staas & Halsey LLP

(57) ABSTRACT

A method, medium, and system for connecting to a communication system in a network having a plurality of nodes capable of communicating with each other. The node requests an identifier to a foreign network when a router advertise (RA) message is received from the foreign network, and then the node connects to the communication system, via the foreign network, by use of the received identifier. A method, medium, and system for delegating a network identifier (prefix) from a server of a foreign network, in a network having a plurality of nodes capable of communicating with each other, so that a node can communicate with the foreign network. The prefix to be used by the nodes in the network is transmitted from the server of the foreign network to the node.

35 Claims, 5 Drawing Sheets

PREFIX DELEGATION SYSTEM AND METHOD OF AD-HOC NETWORK

CROSS-REFERENCE TO RELATED APPLICATIONS

This application claims the benefit under 35 U.S.C. § 119 (a) from Korean Patent Application No. 2004-55134 filed on Jul. 15, 2004 in the Korean Intellectual Property Office, the entire disclosure of which is incorporated herein by reference.

BACKGROUND OF THE INVENTION

1. Field of the Invention

Embodiments of the present invention generally relate to an ad-hoc network. More particularly, embodiments of the present invention relate to an Internet access (connection) system and method of an ad-hoc network.

2. Description of the Related Art

A typical mobile communication system transfers data between a mobile element and a base station. In other words, the mobile terminal and the base station may directly transceive data without passing through other nodes. In contrast, in an ad-hoc network, other nodes may relay data from a source node to a destination node.

The ad-hoc node may be a network spontaneously constructed by mobile nodes. As the nodes may be guaranteed with mobility, the ad-hoc network has a quite flexible structure. The ad-hoc network enables communications between nodes without the support of a conventional mobile communication system, and supports multi-hop transmission. Thus, there may be no limit to communication distance.

Connection to the Internet, among various applications of the ad-hoc network, has recently been under discussion. In detail, this discussion has revolved around concerns of how to connect (access) the ad-hoc network to the Internet by use of an Internet gateway (I/G).

FIG. 1 illustrates a conventional ad-hoc network, the Internet, and an I/G connecting the ad-hoc network and the Internet, which are currently under consideration. However, in reference to FIG. 1, problems of the conventional system are explained below.

The ad-hoc network 100 may include a plurality of nodes, wirelessly connected to the I/G 110. The I/G 110 can be connected to the Internet 120 by wired line, and forwards data from the ad-hoc network 100 to the Internet 120, and vise versa. As the location of the I/G 110 is fixed, in general, the ad-hoc network 100 cannot access the Internet 120 in an uncovered area of the I/G 110. Furthermore, since the number of I/Gs is limited, if a plurality of nodes in the ad-hoc network 110 attempt to access the Internet 120 at the same time, traffic is concentrated to the I/G 110. The traffic concentration degrades network performance such as packet loss and packet transfer delay.

SUMMARY OF THE INVENTION

Embodiments of the present invention have been provided to solve the above-mentioned and other problems and disadvantageous occurring in conventional arrangements, with an aspect of the present invention providing a method and system enabling a node, potentially having guaranteed, mobility in an ad-hoc network to connect to the Internet regardless of its location.

Another aspect of embodiments of the present invention provides a method and system for distributing traffic that is concentrated to a single Internet gateway.

A further aspect of the present invention provides a method and system for efficiently delegating a predetermined number of prefixes.

To achieve the above and/or other aspects and advantages, embodiments of the present invention set forth a method for connecting a node in a network, including a plurality of nodes capable of communicating with each other, including requesting an identifier to a foreign network when a router advertise (RA) message is received from the foreign network, and connecting to a communication system, via the foreign network, by use of the received identifier. The communication system may be an Intranet or Internet.

The node may transmit an RA message, containing the received identifier, to the plurality of the nodes in the network.

In addition, when at least two nodes receive the RA message containing the received identifier, the method may further include selecting the node, selected from the at least two nodes, to be a gateway to the communication system according to a priority in a receipt of the identifier. The node that requests the identifier among the nodes receiving the RA message may functions as a gateway to directly or indirectly connect the network and the communication system, with an alternate node receiving the RA message functioning as a candidate gateway. Further, a node in the network may transmit or receive packets to or from the communication system by using the gateway node or the candidate gateway, and the node in the network transmitting or receiving packets may select the gateway node or candidate gateway to transmit and receive the packets by comparing traffic volumes of the gateway node and the candidate gateway.

The candidate node may create a tunnel to the communication system and transmits and receives packets through the created tunnel. The gateway node may also transmit and receive packets to the communication system using the foreign network.

To achieve the above and/or other aspects and advantages, embodiments of the present invention set forth a method for delegating a network identifier, for identification by a server of a foreign network, in a network including a plurality of nodes capable of communicating with each other, so that a node of the plurality of nodes can communicate with a communication system via the foreign network, including requesting to delegate the network identifier, from the server of the foreign network, when a router advertise (RA) message is received from the foreign network, and receiving the network identifier from the server of the foreign network and delegating the network identifier to a node thereby assigned as a gateway to the communication system, via the foreign network. Here, the network identifier may be a prefix, and the communication system may be an Intranet or Internet.

The requesting of the network identifier delegation may include generating a solicit message containing an identifier of the gateway assigned node requesting the network identifier delegation and a local identifier of the network, and transmitting the generated solicit message.

In addition, when at least two nodes receive the RA message, one of the at least two nodes may be selected as the gateway assigned node according to a priority in the receipt of the network identifier delegation. The gateway assigned node receiving the network identifier may transmits an RA message containing the network identifier to other nodes in the network. Further, the gateway assigned node that requests the network identifier delegation, from the server, among the at least two nodes receiving the RA message from the foreign network, may function as the gateway with the communication system and another node, of the at least two nodes, may function as a candidate gateway to the communication system. The candidate gateway node may also functions as the gateway to the communication system when an RA message is not received from the gateway assigned node at predetermined time intervals.

The method may further include requesting to re-delegate the delegated network identifier to the candidate gateway node so the candidate gateway node can function as default gateway to the communication system. The re-delegating of the delegated network identifier may include transmitting a solicit message containing the delegated network identifier, an identifier of the gateway assigned node, and an identifier of the candidate gateway node, and re-delegating the network identifier, by the server, to reassign the candidate gateway as the default gateway when information contained in the solicit message matches information pre-stored in the server.

To achieve the above and/or other aspects and advantages, embodiments of the present invention set forth a medium and/or media including computer readable code implementing embodiments of the present invention.

To achieve the above and/or other aspects and advantages, embodiments of the present invention set forth a networking system including a plurality of nodes, communicating with a communication system via a foreign network, the networking system including a gateway node communicating with the communication system through the foreign network based upon a request and receipt of an identifier to the foreign network when a router advertise (RA) message is received from the foreign network, and a candidate gateway node communicating with the communication system through a tunnel without communication with the foreign network, based upon a receipt of the RA message from the foreign network, wherein a node within the networking system can selectively communicate with the communication system through at least the gateway node and/or the candidate node.

The candidate gateway node may be reassigned to be a new gateway node, to replace the gateway node, upon the candidate node transmitting a solicit message containing the identifier, an identifier of the gateway node, and an identifier of the candidate gateway node, and a re-delegating of identifier, by a server, to reassign the candidate gateway as a default gateway when information contained in the solicit message matches information pre-stored in the server. The candidate gateway may transmit the solicit message upon a lack of reception of RA messages from the gateway node after a period of time, and the period of time is a random period of time, different in each candidate gateway. Further, wherein the candidate gateway may be one of the each candidate gateways in which the period of time is shortest.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of exemplary embodiments, taken in conjunction with the accompanying drawing figures of which.

DETAILED DESCRIPTION OF THE PREFERRED EMBODIMENTS

Figure 1:
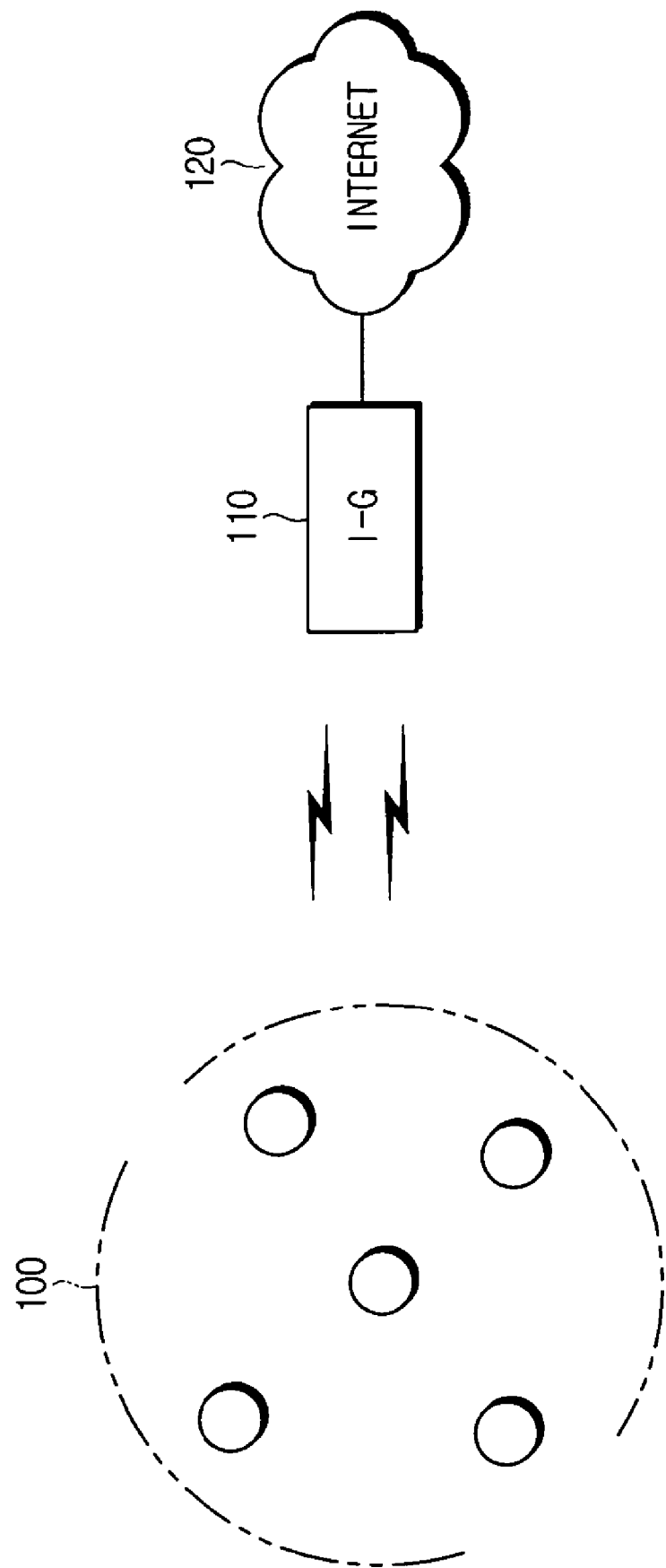
FIG. 1 illustrates a conventional ad-hoc network connected to the Internet.

Reference will now be made in detail to embodiments of the present invention, examples of which are illustrated in the accompanying drawings, wherein like reference numerals refer to the like elements throughout. The embodiments are described below to explain the present invention by referring to the figures.

According to an embodiment of the present invention, some nodes in an ad-hoc network may serve as an Internet gateway (I/G). If traffic is concentrated to a specific I/G, the traffic can be distributed to other I/Gs. Furthermore, a network identifier (prefix) can be delegated to each network.

Figure 2:
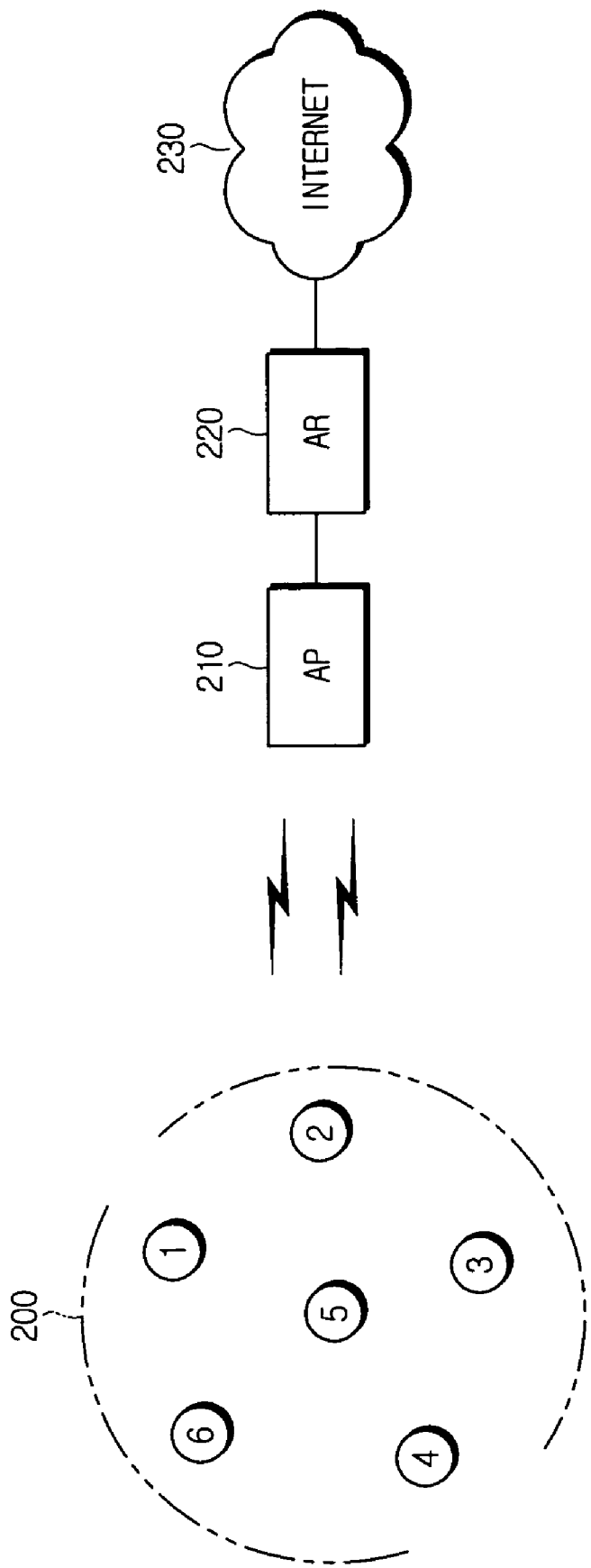
FIG. 2 illustrates an ad-hoc network connected to the Internet, according to an embodiment of the present invention.

FIG. 2 illustrates an ad-hoc network 200 communicating with the Internet 230, a wireless local area network (WLAN) connecting the ad-hoc network 200 and the Internet 230. Especially, the WLAN in FIG. 2 includes an access point (AP) 210 and an access router (AR) 220. The WLAN may further include other components in addition to the AP 210 and the AR 220, but only these components are illustrated to facilitate understanding of the present invention. The WLAN of FIG. 2 can connect the ad-hoc network 200 and the Internet 230, but is not limited to this system. Any other communication systems may be adopted to connect the ad-hoc network 200 and the Internet 230. In addition, embodiments of the present invention are not limited to the Internet, but are also applicable to alternative systems, e.g., a proprietary WLAN, LAN, or Intranet, noting that additional alternative systems are also available.

The following description explains that the ad-hoc network 200 may first be connected with (accesses) the AR 220 of the WLAN to establish the connection between the ad-hoc network 200 and the Internet 230. The connection between the AR 220 and the Internet 230 can be achieved according to conventional methods, for example.

The AR 220 may generate and provide a router advertise (RA) message to the AP 210 at predetermined time intervals. The AP 210 may then forward the received RA message to the ad-hoc network 200. The RA message from the AP 210 may be received by at least one node in the ad-hoc network 200. According to an embodiment of the present invention, nodes receiving the RA message serve as an I/G. However, of course, if a distance between the AP 210 and the ad-hoc network 200 exceeds a receiving range of the RA message, none of the nodes in the ad-hoc network 200 may receive the RA message at all. Therefore, hereinafter, embodiments of the present invention will be described based on at least one node in the ad-hoc network 200 receiving the RA message.

Nodes 1 through 3 in the ad-hoc network 200 may receive a RA message from the AP 210. Further, the node 2 may receive the RA message prior to the nodes 1 and 3. The node 2 receiving the RA message can then serves as a default I/G (D-I/G), and the nodes 1 and 3 subsequently receiving the RA message can serve as respective candidate I/Gs(C-I/Gs). Upon receiving the RA message, the node 2 can request a global prefix from the AP 210. The global prefix is an identifier of the ad-hoc network 200. Details on the global prefix provided from the AP 210 to the node 2 will now be described below.

Upon receiving the global prefix, from AP 210, the node 2 can transmit a RA message containing the global prefix to other nodes in the ad-hoc network 200, at predetermined time intervals. The nodes 1 and 3, upon the receipt of the RA message, do not request the global prefix to the AP 210. That is, if a node receiving a RA message from the node AP 210 receives a RA message containing the global prefix from another node, that node receiving the RA message containing the global prefix from the other node serves as the C-I/G.

Supposing that a plurality of nodes in the ad-hoc network request to transmit packets to the D-I/G simultaneously, at a specific time. As a result, the D-I/G may be subjected to overload, and it may be impossible for the D-I/G to transmit the generated packets rapidly to the Internet 230. To address these problems, some functions of the D-I/G can be carried out by other nodes instead, according to an embodiment of the present invention. In particular, the other nodes carrying out some of the functions of the D-I/G may be the C-I/G nodes.

If the number of packets transceived by the D-I/G exceeds a set value, a node requesting communication with the Internet can transmit data destined for the Internet 230 to a C-I/D. If there are more than one C-I/G in the ad-hoc network 200, one of the C-I/Gs can be selected according to a user's setting, e.g., the nearest C-I/G to a node the packet is destined for can be selected.

Figure 3:
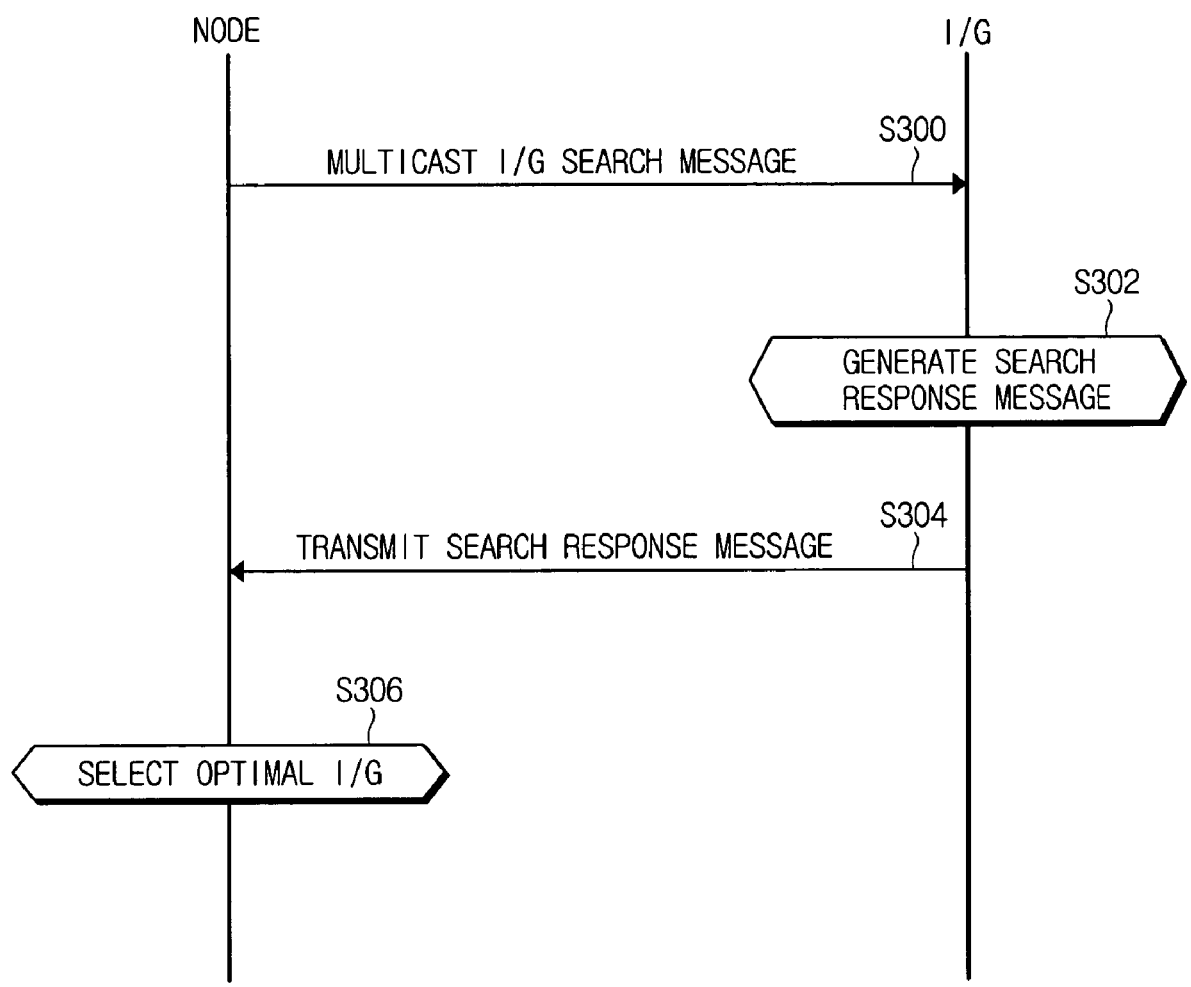
FIG. 3 illustrates a node in the ad-hoc network, searching for an Internet gateway, according to an embodiment of the present invention.

In view of the foregoing, in selecting an I/G for the packet transmission, priority can be given with respect to the D-I/G. However, a node that wants to access the Internet 230 may also multicast an I/G search message to the entire ad-hoc network 200, for example. The following description will be made for a method using the I/G search message to select an I/G for the packet transmission, in relation with FIG. 3.

The node in the ad-hoc network may multicast an I/G search message (S300), and the I/G receiving the I/G search message may generate a search response message (S302). The search response message can contain prefix (identifier) information, traffic information, and the like, for example. The I/G then transmits the generated search response message to the node (S304). The node can then select a suitable, substantially optimal, I/G to forward generated packets to, based on use of the received search response message. In further detail, when search response messages are received from more than two I/Gs, a suitable, substantially optimal, I/G can be selected based on the traffic information contained in the search response messages and the distance from the node to the I/G, for example. Accordingly, it becomes possible to prevent an overload of a specific I/G by selecting a suitable, substantially optimal, I/G for packet transmission using the traffic information, for example.

As illustrated, the C-I/G (node 1 or node 3), which receives the packets destined for the Internet 230, can establish a route to a corresponding node of the Internet 230. Note that the C-I/G can set up the route in a different manner than the routing method of the D-I/G Since the ad-hoc network 200 may use a single global prefix, if a node on the Internet 230 transmits packets to more than two I/Gs, transmission confusion is caused. To prevent this transmission confusion, the C-I/G can create a tunnel to the corresponding node of the Internet 230 and may utilize an IPv6 routing header. The C-I/G can then transmit and receive packets to and from the corresponding node using the created tunnel.

Figure 4A:
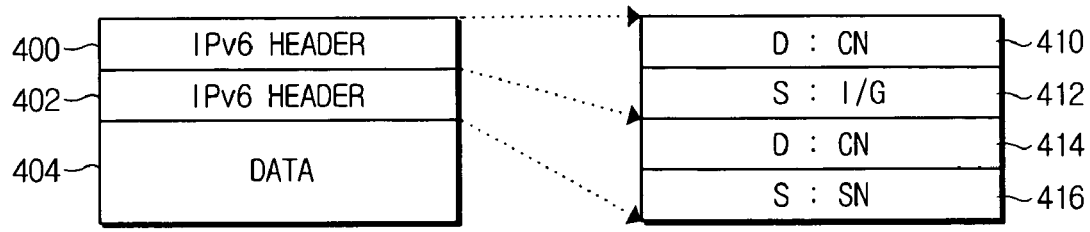
FIGS. 4A and 4B illustrate transmission frame structures of a candidate Internet gateway that creates a tunnel to the Internet, according to an embodiment of the present invention.
Figure 4B:
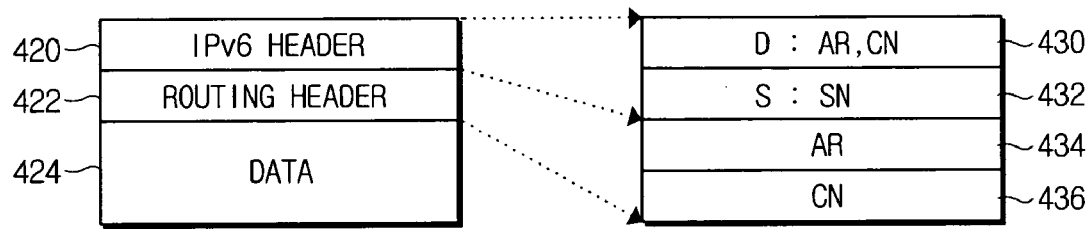

FIGS. 4A and 4B illustrate packet structures for a route configuration between the C-I/G and the corresponding node of the Internet 230. Particularly, FIG. 4A depicts router configuration using two IPv6 headers, and FIG. 4B depicts router configuration using one IPv6 header and one routing header. The structure of the packets will now be discussed with greater detail.

In FIG. 4A, the IPv6 header 400 may include a destination node identifier 410 and a source node identifier 412, for example. The IPv6 header 402 may include a destination node identifier 414 and a source node identifier 416, for example. The destination node identifier 410 may be an identifier of the corresponding node of the Internet, and the source node identifier 412 may be an identifier of the I/G (C-I/G). The destination node identifier 414 may be an identifier of the corresponding node of the Internet 230, and the source node identifier 416 may be an identifier of a node that generates packets ready to transmit in the ad-hoc network 200. Data 404 may include the packets ready to be transmitted. The generated packets can be delivered using the two destination node identifiers 410 and 414, and the two source node identifiers 412 and 416. In short, the generated packets can be directly transceived using only source node identifiers and destination node identifiers.

In FIG. 4B, a destination node identifier 430 of an IPv6 header 420 may be an identifier of an AR identifier and an identifier of a corresponding node of the Internet 230. A source node identifier 432 may be an identifier of a node generating packets to be transmitted in the ad-hoc network 200, and a routing header 422 may include identifiers of the AR and the correspondent node on the Internet 230.

The following description details the global prefix delegation by the D-I/G, according to an embodiment of the present invention. First, problems occur when a prefix is delegated to more than one I/G in an ad-hoc network. When different prefixes are delegated to the single network, the plurality of the prefixes cause errors. In addition, when a plurality of prefixes are delegated to one network, additional prefixes are then required for other networks.

Figure 5:
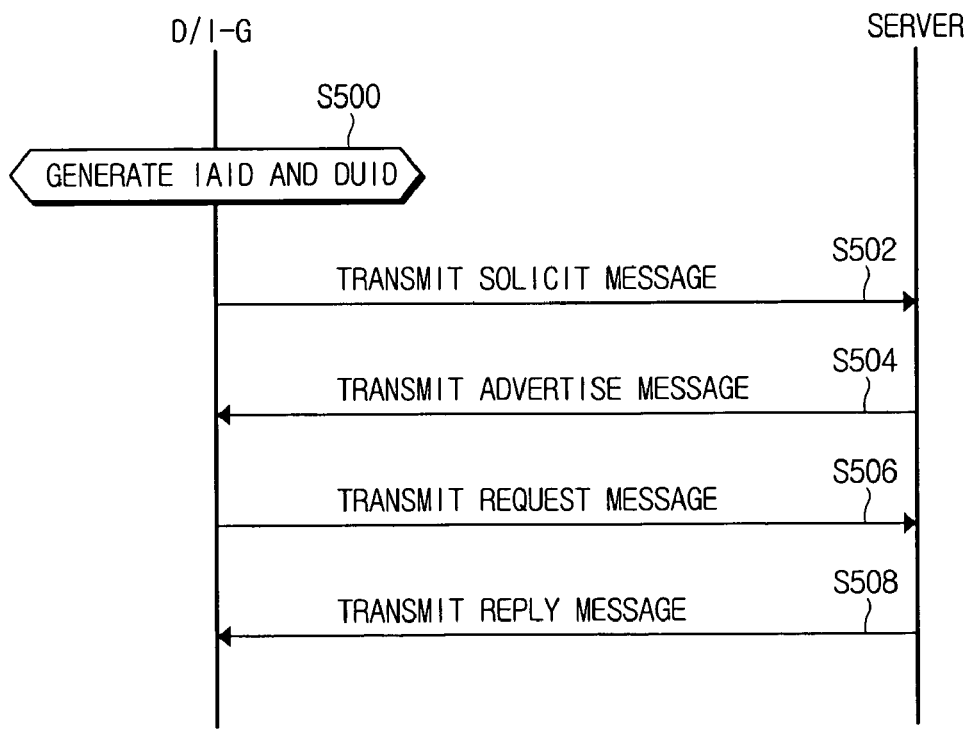
FIG. 5 illustrates global prefix delegation at a default Internet gateway, according to an embodiment of the present invention.

The global prefix delegation at the D-I/G will now be explained with reference to FIG. 5. Here, the term 'global' will be used to imply that one prefix is delegated to one ad-hoc network.

Upon receiving a RA message from the AP 210, the D-I/G can generate a dynamic host configuration protocol (DHCP) unique identifier (DUID) and an identity association identifier (IAID) (S500). The DUID can be generated using the corresponding MAC address, and the IAID can be generated using the corresponding site-local address.

Figure 6:
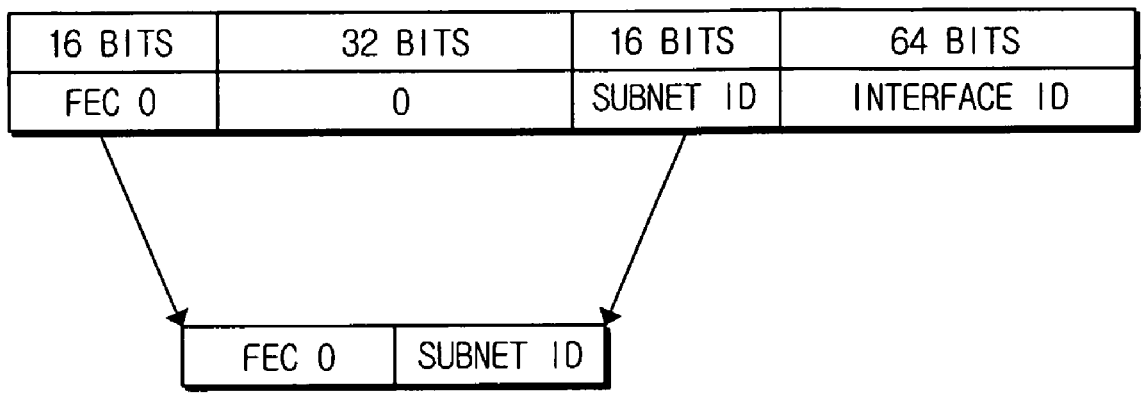
FIG. 6 illustrates the generation of an identity association identifier (IAID), according to an embodiment of the present invention.

A frame structure of the site-local address is illustrated in FIG. 6. The generation of the IAID will now be set forth with reference to the frame structure of the site-local address.

The IAID can be generated using the site-local address, specifically, using 32 bits in the front portion of the site-local address, for example, noting that the IAID may exceed 32 bits or be generated using other portions of the site-local address, according to the user's setting, for example.

Referring again to FIG. 5, the D-I/G may send, to a server, a solicit message including the IAID and the DUID (S502). The solicit message may be delivered to the server via the AP 210 and the AR 220, for example. Typically, the server is connected to the AR 210. The solicit message contains IAID, to request a global prefix. Upon receiving the solicit message, the server can then recognize the DUID and the IAID of the D-I/G, and store the IAID together with an IA_PD (Identity Association for Prefix Delegation) being a list of prefixes.

The server can then generate an advertise message, in reply to the solicit message, and transmit the advertise message to the D-I/G (S504). The advertise message can contain the global prefix requested by the D-I/G. The server can then select one global prefix based on the provided information and the available global prefixes, and append the selected global prefix to the advertise message. Therefore, the global prefix can be delegated to the D-I/G.

The D-I/G may transmit a request message to the server (S506), with the request message confirming the delegated global prefix. The server can then transmit a corresponding reply message to the D-I/G (S508).

The D-I/G then sends the delegated global prefix to other nodes in the ad-hoc network 200. Here, the D-I/G may multicast to the ad-hoc network 200 a RA message containing the global prefix and a link-layer address option at predetermined time intervals, for example. Upon receiving the multicast RA message, the nodes in the ad-hoc network can recognize the delegated global prefix.

The following sets forth a case when the D-I/G moves out of the network and becomes inoperable. As aforementioned, the D-I/G can multicast the RA message at predetermined time intervals. However, if the location of the D-I/D changes, the D-I/G may not be able to multicast the RA message. Thus, if the RA message is not received at the predetermined time intervals, a C-I/G may determine that an error has occurred at the D-I/G, that is, the C-I/G may determine that the D-I/G can not provide the D-I/G function any more. As a result, the C-I/G can then serve as the D-I/G.

In the case where more than two C-I/Gs are present in the ad-hoc network, one of the C-I/Gs may function as the D-I/G, in a prescribed order. Operations of the C-I/G will be described below. If no RA message has been received from the D-I/G, the C-I/G may check the connection to the D-I/G after a latency time, e.g., the latency time being randomly set. When a disconnection of the D-I/G has been determined, the C-I/Gs transmit a solicit message to the server to request the global prefix. As the set latency time differs for each of the C-I/Gs, only one C-I/G at a time may request the global prefix to the server, with one C-I/G requesting having the lowest latency time performing the first request for the global prefix. Subsequently, any C-I/G then receiving an RA message from the one C-I/G will not then request the global prefix to the server, i.e., as one C-I/G has already requested the global prefix and will be the new D-I/G there is no need for the remaining C-I/Gs to request the global prefix.

Figure 7:
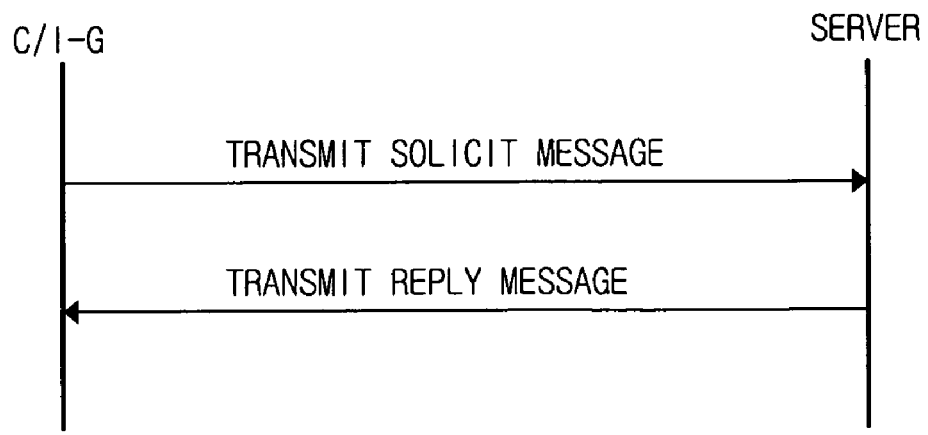
FIG. 7 illustrates the candidate Internet gateway being permitted to use the global prefix, according to an embodiment of the present invention.

To function as the D-I/G, the C-I/G needs to provide required information to the server. Operations between the C-I/G and the server will now be set forth with reference to FIG. 7.

The C-I/G can transmit a solicit message to the server (S700). If the C-I/G cannot function as the D-I/G after transmitting the solicit message, another C-I/G will then transmit the solicit message. As the ad-hoc network already uses the delegated global prefix, as above, there is no need to re-delegate a new global prefix. The only requirement is to determine whether the C-I/G and the D-I/G are located in the same ad-hoc network, for example.

To respond to the above requirement, the solicit message may contain the IAID, the DUID of the C-I/G, and the DUID of the D-I/G. Upon receiving the solicit message, the server will be alerted that the C-I/G wants to function as the D-I/G. To be specific, the server will then recognize, by use of the IAID, that the C-I/G and the D-I/G are located in the same network, and recognize, by use of the DUID of the D-I/G, that the C-I/G wants to function as the D-I/G.

In the event that the solicit message includes a rapid commit option, the server receiving this solicit message may transmit a reply message to the C-I/G (S702). Compared with the operation described in FIG. 5, the C-I/G will be permitted to reuse the global prefix by way of these two messages. Subsequently, the C-I/G can then function as the D-I/G.

Table 1, below, shows an exemplary structure of the solicit message.

TABLE 1

| 1 | transaction-id |
|---|---|
| Client Identifier option | |
| IA_PD option | |
| Client Identifier Exchange option | |

Here, the transaction-id can be a message identifier, the Client Identifier option may include the IAID, the IA_PD may include the length of the required prefix, a lifetime parameter, and the like, and the Client Identifier Exchange option may include the DUID.

In light of the foregoing, as explained above, some nodes in an ad-hoc network can function as the I/G so that the nodes in the ad-hoc network, with mobility potentially guaranteed, are able to access the Internet regardless of their locations. If traffic is concentrated to a specific I/G, the traffic may then be distributed to other I/Gs, thus removing network performance degradation causes, such as packet loss and packet transfer delay. Furthermore, one network identifier (prefix) can be delegated to each network so as to prevent confusions due to the plurality of prefixes and the potentially limited number of prefixes.

In addition to the above described embodiments, embodiments of the present invention can also be implemented through computer readable code/instructions in/on a medium, e.g., a computer readable medium. The medium can correspond to any medium/media permitting the storing and/or transmission of the computer readable code.

The computer readable code can be recorded/transferred on a medium in a variety of ways, with examples of the medium including magnetic storage media (e.g., ROM, floppy disks, hard disks, etc.), optical recording media (e.g., CD-ROMs, or DVDs), and storage/transmission media such as carrier waves, as well as through the Internet, for example. The media may also be a distributed network, so that the computer readable code is stored/transferred and executed in a distributed fashion.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method for connecting a node in an ad-hoc network, comprising a plurality of nodes including the node and remaining nodes capable of communicating with each other, the method comprising:

providing communication to the remaining nodes with a communication system, after the node requests an identifier to a foreign network, when a router advertise (RA) message is received by the node from the foreign network and after the node connects to the communication system, via the foreign network, by use of the received identifier, to act as a gateway to the communication system for the remaining nodes of the plurality of nodes; and providing communication with the communication system through the gateway node from a candidate gateway node within the remaining nodes acting as another concurrent gateway for nodes within the ad-hoc network, the candidate gateway node receiving the RA message including the identifier from the node acting as the gateway node.

2. The method of claim 1, wherein the communication system is an Intranet or Internet.

3. The method of claim 1, wherein the node transmits an RA message, containing the received identifier, to the remaining nodes in the network.

4. A method for connecting a node in a network, comprising a plurality of nodes capable of communicating with each other, comprising:

requesting an identifier to a foreign network when a router advertise (RA) message is received from the foreign network; and connecting to a communication system, via the foreign network, by use of the received identifier, wherein, when at least two nodes receive the RA message directly from the foreign network, one of the nodes, selected from the at least two nodes, requests the identifier according to a priority in reception of the RA message from the foreign network and serves as a gateway to the communication system, wherein the node, as a gateway node, that requests the identifier among the nodes receiving the RA message functions as the gateway to directly or indirectly connect the network and the communication system, with a candidate gateway node receiving the RA message functioning as a concurrent candidate gateway.

5. The method of claim 4, wherein a node in the network transmits or receives packets to or from the communication system by selectively using one of the gateway node and the candidate gateway node.

6. The method of claim 5, wherein the node in the network transmitting or receiving packets selects the one of the gateway node and candidate gateway node to transmit and receive the packets by comparing traffic volumes of the gateway node and the candidate gateway node.

7. The method of claim 5, wherein the candidate gateway node creates a tunnel to the communication system and transmits and receives packets through the created tunnel.

8. The method of claim 5, wherein the gateway node transmits and receives packets to the communication system using the foreign network.

9. A method for delegating a network identifier, for identification by a server of a foreign network, of an ad-hoc network comprising a plurality of nodes including a node and remaining nodes capable of communicating with each other, so that the node of the plurality of nodes can communicate with a communication system via the foreign network, comprising:

requesting by the node to delegate the network identifier, from the server of the foreign network, when a router advertise (RA) message is received by the node from the foreign network;

receiving the network identifier from the server of the foreign network and delegating the network identifier to the node thereby assigned to be a gateway to the communication system, via the foreign network for remaining nodes of the plurality of nodes; and providing communication through the gateway node from a candidate gateway node of the remaining nodes acting as another gateway to the communication system for nodes within the ad-hoc network, the candidate gateway node receiving the RA message including the identifier from the node acting as the gateway node, with the candidate gateway node acting as the other gateway to the communication system for nodes within the ad-hoc network concurrently with provision of communication for nodes within the ad-hoc network by the node acting as the gateway to the communication system.

10. The method of claim 9, wherein the network identifier is a prefix.

11. The method of claim 9, wherein the communication system is an Intranet or Internet.

12. The method of claim 9, wherein the requesting of the network identifier delegation includes generating a solicit message containing an identifier of the gateway assigned node requesting the network identifier delegation and a local identifier of the network, and transmitting the generated solicit message.

13. A method for delegating a network identifier, for identification by a server of a foreign network, in a network comprising a plurality of nodes capable of communicating with each other, so that a node of the plurality of nodes can communicate with a communication system via the foreign network, comprising:

requesting to delegate the network identifier, from the server of the foreign network, when a router advertise (RA) message is received from the foreign network; and receiving the network identifier from the server of the foreign network and delegating the network identifier to a node thereby assigned as a gateway to the communication system, via the foreign network, wherein, when at least two nodes receive the RA message directly from the foreign network, one of the at least two nodes requests the identifier according to a priority in reception of the RA message from the foreign network and serves as the gateway assigned node, and wherein the gateway assigned node that requests the network identifier delegation, from the server, among the at least two nodes receiving the RA message from the foreign network, functions as the gateway with the communication system and another node, of the at least two nodes, functions as a concurrent candidate gateway to the communication system.

14. The method of claim 13, wherein the gateway assigned node receiving the network identifier transmits an RA message containing the network identifier to other nodes in the network.

15. The method of claim 13, wherein the candidate gateway node functions as the gateway to the communication system when an RA message is not received from the gateway assigned node at predetermined time intervals.

16. The method of claim 15, further comprising requesting to re-delegate the delegated network identifier to the candidate gateway node so the candidate gateway node can function as default gateway to the communication system.

17. The method of claim 16, wherein the re-delegating of the delegated network identifier comprises:

transmitting a solicit message containing the delegated network identifier, an identifier of the gateway assigned node, and an identifier of the candidate gateway node; and re-delegating the network identifier, by the server, to reassign the candidate gateway as the default gateway when information contained in the solicit message matches information pre-stored in the server.

18. A medium and/or media storing computer readable code to control a computing device to implement the method of claim 1.

19. A medium and/or media storing computer readable code to control a computing device to implement the method of claim 9.

20. A networking system comprising a plurality of nodes, communicating with a communication system via a foreign network, the networking system comprising:
 a gateway node communicating with the communication system through the foreign network based upon a request and receipt of an identifier to the foreign network when a router advertise (RA) message is received from the foreign network; and
 a candidate gateway node concurrently communicating with the communication system through a tunnel without subsequent communication with the foreign network, after a receipt of the RA message from the foreign network through the gateway node,
 wherein a node within the networking system can selectively communicate with the communication system through at least the gateway node and/or the candidate node.

21. The networking system of claim 20, wherein the candidate gateway node is reassigned to be a new gateway node, to replace the gateway node, upon the candidate node transmitting a solicit message containing the identifier, an identifier of the gateway node, and an identifier of the candidate gateway node, and a re-delegating of identifier, by a server, to reassign the candidate gateway as a default gateway when information contained in the solicit message matches information pre-stored in the server.

22. The networking system of claim 21, wherein the candidate gateway transmits the solicit message upon a lack of reception of RA messages from the gateway node after a period of time.

23. The networking system of claim 22, wherein the period of time is a random period of time, different in each candidate gateway.

24. The networking system of claim 23, wherein the candidate gateway is one of the each candidate gateways in which the period of time is shortest.

25. A medium and/or media storing computer readable code to control a computing device to implement the method of claim 4.

26. A medium and/or media storing computer readable code to control a computing device to implement the method of claim 13.

27. The method of claim 1, wherein the node, as a gateway node, that requests the identifier among all nodes receiving the RA message functions as the gateway to directly or indirectly connect the network and the communication system, with the candidate gateway node receiving the RA message functioning as a candidate gateway.

28. The method of claim 27, wherein a node in the network transmits or receives packets to or from the communication system by selectively using one of the gateway node and the candidate gateway node.

29. The method of claim 28, wherein the node in the network transmitting or receiving packets selects the one of the gateway node and candidate gateway node to transmit and receive the packets by comparing traffic volumes of the gateway node and the candidate gateway node.

30. The method of claim 28, wherein the candidate gateway node creates a tunnel through the gateway node to the communication system and transmits and receives packets through the created tunnel.

31. The method of claim 28, wherein the gateway node transmits and receives packets to the communication system using the foreign network.

32. A networking method for an ad-hoc network system communicating with a communication system, the ad-hoc network system including a plurality of nodes capable of communicating with each other, the method comprising:
 communicating by a gateway node with the communication system through a foreign network based upon a request and receipt of an identifier to the foreign network, by the gateway node, when a router advertise (RA) message is received by the gateway node from the foreign network; and
 communicating with the communication system through a tunnel, from a candidate gateway node, through the gateway node, the candidate gateway node having received the RA message including the identifier from the node acting as the gateway node,
 wherein a node of the plurality of nodes can selectively communicate with the communication system through at least one of the gateway node and the candidate node, and
 wherein both the gateway node and the candidate gateway node are nodes of the plurality of nodes and concurrently act as gateways to the communication system.

33. A medium and/or media storing computer readable code to control a computing device to implement the method of claim 32.

34. A networking method for an ad-hoc network system communicating with a communication system, the ad-hoc network system including a plurality of nodes capable of communicating with each other, the method comprising:
 communicating, from a candidate gateway node through a tunnel through a gateway node, with the communication system through a foreign network based upon a request and receipt, by the gateway node, of an identifier to the foreign network when a router advertise (RA) message is received by at least the gateway node from the foreign network, the candidate gateway node having received the RA message including the identifier from the node acting as the gateway node,
 wherein a node of the plurality of nodes can selectively communicate with the communication system through at least one of the gateway node and the candidate node, and
 wherein both the gateway node and the candidate gateway node are nodes of the plurality of nodes and concurrently act as gateways to the communication system for at least remaining nodes of the plurality of nodes.

35. A medium and/or media storing computer readable code to control a computing device to implement the method of claim 34.

* * * * *